US008874951B1

(12) United States Patent
Chuang et al.

(10) Patent No.: US 8,874,951 B1
(45) Date of Patent: Oct. 28, 2014

(54) PRIVATE PEER-TO-PEER NETWORK PLATFORM FOR SECURE COLLABORATIVE PRODUCTION AND MANAGEMENT OF DIGITAL ASSETS

(75) Inventors: Richard Chuang, Sunnyvale, CA (US); David Franklyn DeBry, Salt Lake City, UT (US)

(73) Assignee: Cloudpic Global Inc., Cupertino, CA (US)

( * ) Notice: Subject to any disclaimer, the term of this patent is extended or adjusted under 35 U.S.C. 154(b) by 160 days.

(21) Appl. No.: 13/080,641

(22) Filed: Apr. 5, 2011

Related U.S. Application Data

(60) Provisional application No. 61/341,742, filed on Apr. 5, 2010.

(51) Int. Cl.
| | |
|---|---|
| G06F 15/16 | (2006.01) |
| H04L 29/06 | (2006.01) |
| G06F 1/04 | (2006.01) |
| G06F 1/12 | (2006.01) |
| G06F 17/30 | (2006.01) |

(52) U.S. Cl.
USPC ........... 713/375; 713/155; 709/204; 709/205; 709/206; 709/248; 726/2; 726/3; 726/4; 726/21; 726/28

(58) Field of Classification Search
USPC .................. 380/277–282; 709/248, 204–206; 713/155, 375; 726/1–4, 21, 26–29
See application file for complete search history.

(56) References Cited

U.S. PATENT DOCUMENTS

| | | | |
|---|---|---|---|
| 7,082,457 B1 * | 7/2006 | Burianek et al. .............. 709/204 |
| 7,127,501 B1 * | 10/2006 | Beir et al. ...................... 709/219 |
| 7,546,353 B2 * | 6/2009 | Hesselink et al. ............ 709/216 |
| 7,587,467 B2 * | 9/2009 | Hesselink et al. ............ 709/214 |
| 7,937,752 B2 * | 5/2011 | Balfanz et al. .................... 726/9 |
| 8,166,565 B1 * | 4/2012 | Tormasov et al. .............. 726/27 |
| 2003/0125057 A1 * | 7/2003 | Pesola ........................... 455/502 |
| 2003/0200459 A1 * | 10/2003 | Seeman ........................ 713/200 |
| 2004/0044891 A1 * | 3/2004 | Hanzlik et al. ................ 713/150 |
| 2005/0165859 A1 * | 7/2005 | Geyer et al. ................... 707/201 |
| 2005/0210392 A1 * | 9/2005 | Koide et al. ................... 715/751 |
| 2006/0031418 A1 * | 2/2006 | Savage .......................... 709/219 |
| 2006/0117179 A1 * | 6/2006 | Karabulut ..................... 713/175 |
| 2006/0161585 A1 * | 7/2006 | Clarke et al. ............... 707/104.1 |
| 2007/0050446 A1 * | 3/2007 | Moore .......................... 709/203 |
| 2007/0124737 A1 * | 5/2007 | Wensley et al. ............... 719/314 |
| 2008/0154903 A1 * | 6/2008 | Crowley et al. ................... 707/9 |
| 2008/0162551 A1 * | 7/2008 | Geyer et al. .............. 707/103 R |
| 2009/0092252 A1 * | 4/2009 | Noll et al. ..................... 380/277 |

(Continued)

*Primary Examiner* — Tae Kim

(57) ABSTRACT

Asset management systems and methods are presented. In one embodiment, a system includes a computing resource associated with a project member. A project container is stored on the computing resource, wherein the project container comprises encrypted objects related to a project. The encrypted objects includes project metadata and one or more working objects associated with one or more sub-projects of which the project member is granted permissioned access. An encryption/decryption engine is included for encrypting and decrypting the encrypted objects. The system includes an archive file system for storing the encrypted objects and previous versions of the objects, and a façade file system for viewing and accessing and interacting with the one or more working objects. Other computing resources associated with other project members are similarly configured, wherein a plurality of project containers store distributed objects that are grouped within the project. An authentication server provides authenticated access to each of the plurality of project containers, and authenticated peer-to-peer communication between the plurality of project containers.

17 Claims, 7 Drawing Sheets

(56) References Cited

U.S. PATENT DOCUMENTS

| | | | |
|---|---|---|---|
| 2009/0187982 A1* | 7/2009 | Balfanz et al. | 726/9 |
| 2009/0210697 A1* | 8/2009 | Chen et al. | 713/153 |
| 2010/0094921 A1* | 4/2010 | Roy et al. | 709/201 |
| 2010/0274816 A1* | 10/2010 | Guzik | 707/802 |
| 2011/0137991 A1* | 6/2011 | Russell | 709/204 |

* cited by examiner

PRIVATE PEER-TO-PEER NETWORK PLATFORM FOR SECURE COLLABORATIVE PRODUCTION AND MANAGEMENT OF DIGITAL ASSETS

CROSS REFERENCE TO RELATED APPLICATIONS

This application claims priority to and the benefit of the commonly owned, provisional patent application, U.S. Ser. 61/341,742, entitled "PRIVATE PEER-TO-PEER NETWORK PLATFORM FOR SECURE COLLABORATIVE PRODUCTION AND MANAGEMENT OF DIGITAL ASSETS," with filing date Apr. 5, 2010, which is herein incorporated by reference in its entirety.

BACKGROUND

A project for creating a digital product involves many participants each making small contributions of digital assets, and working together in collaboration to create the finished product. For instance, behind the creation of an animated movie, teams of individuals work for many months on scenes that are later joined together in the finished product. Because the work involves large amounts of computing resources, these teams typically are supported by a central server that processes and stores digital assets associated with the project. This involves establishing a large information technology infrastructure along with a team for maintaining the infrastructure.

While the server centric model works well on high speed networks such as Local Area Networks within a localized area, it breaks down when project team spans across the globe and the data latency becomes too large. For instance, the server centric model is best configured to support teams that are located within the same building or on the same campus. Importantly, minimal latency is introduced in the processing, storing and transferring of information such that collaboration between partners is at or near real-time.

However, many projects involve team members that are located throughout the world. Serving team members on both sides of the globe from a central server introduces increased latency, especially when involving the transfer of information between parties located in different regions. Part of the reason is that the central server has to process data, and then ship that data a longer distance through more switches and routers to support team members located half way around the globe. This latency contributes to a communication disjoint between project members located in different regions, and for team members located far from the central server that are waiting for data. Normally, an artist would have very quick access to files and would expect quick responses from his or her content creation tools accessing the files. An artist waiting for a file or related information to be processed from the central server can quickly lose his or her creative energy and drive.

As such, one viable solution is to create duplicate servers on both sides of the globe. That is, information between the two servers is continually synchronized in an effort to provide server centric models that are localized to particular regions. This new model greatly reduces the problem of latency when involving the processing, storing, and the transfer of information for remote team members. However, with the added servers, additional infrastructure is necessary, along with additional maintenance staff to establish and maintain the new infrastructure. This in turn, requires additional cost in equipment and staffing. As this cycle repeats to support team members in new regions, more and more infrastructure and staffing to maintain that infrastructure is required, thereby further driving the cost up for the creation of a digital product.

The cost of establishing and maintaining a server centric information technology infrastructure is prohibitive to smaller teams distributed throughout the world and more importantly, artistic teams generally do not have the technology expertise to set up and maintain such systems.

SUMMARY

Asset management systems and methods are presented in embodiments. A private peer-to-peer network platform for secure collaborative production and management of digital assets provides a computer implemented networked system, the purpose of which is to facilitate remote and local project members to securely collaborate on projects involving digital objects (e.g., files assets, etc.) which may require version control. The system supports many concurrent projects where each project occupies its own virtual network of client peers that securely communicate with each other within a corresponding network after receiving permission from an authentication server.

In one embodiment, a system includes a computing resource associated with a project member. A project container is stored on the computing resource, wherein the project container comprises encrypted objects related to a project. The encrypted objects includes project metadata and one or more working objects associated with one or more sub-projects of which the project member is granted permissioned access and could include previous versions of said objects. An encryption/decryption engine is included for encrypting and decrypting the encrypted objects. The system includes an archive file system for storing the encrypted objects and possibly their previous versions, and a façade or user visible interface for viewing and accessing the one or more working objects. Other computing resources associated with other project members are similarly configured, wherein a plurality of project containers store distributed objects that are grouped within the project. An authentication server provides authenticated access to each of the plurality of project containers, and authenticated peer-to-peer communication among the plurality of project containers.

In another embodiment, a computer implemented method for asset management is disclosed, and provides for authentication of a user to access a project container containing project assets stored on a local computer. The computer-implemented method includes sending a request from a local computing resource to an authentication server to access a local project container stored on the local computing resource. The local project container is associated with a plurality of project containers stored on a plurality of computing resources of a plurality of project members. The plurality of computing resources is supported by a communication network to facilitate peer-to-peer communication between pairs of computing resources. In addition, distributed objects are stored on the plurality of project containers as a group within the project. The computer implemented method further includes receiving authentication for the local project member associated with the local computing resource to access the local project container. The local container includes encrypted objects related to the project, wherein the encrypted objects includes project metadata related to the distributed objects and one or more working objects associated with one or more sub-projects, of which the local project member is granted permissioned access. Further, if the local member has been authenticated and granted permission, the working objects stored in the local project container are decrypted and made accessible to the local project member via the façade file system.

Further, in another embodiment, objects that are committed to the project are stored locally within the project container and also distributed to project members who have permissioned access in the computer implemented method. For instance, a new object is received for committing to the project. New metadata is generated that is associated with the new object, and is encrypted for storage in the local project container. In addition, the new object is also encrypted for storage in the local project container. The new metadata is sent to one or more of the plurality of computing resources over corresponding peer-to-peer communication sessions that are secure. In addition, in the computer implemented method the new object is sent to one or more project members who are granted permissioned access to the new object who in turn will send the object to other permissioned team members who have not yet received the object or parts of the object. In that manner, the new object is eventually distributed to all project members who are granted permissioned access to the new object through the peer-to-peer communication network.

In still another embodiment, a computer implemented method for asset management is disclosed, in which an authentication server provides authenticated access to distributed containers (e.g., access to local container to a local user) and to establish secure communication sessions between project members in a peer-to-peer communication network. The computer implemented method includes receiving a request from a computing resource to access a project container associated with the computing resource. The computing resource is associated with a project member. In addition, the project container is associated with a plurality of project containers stored on a plurality of computing resources of a plurality of project members. The plurality of computing resources is supported by a communication network in order to establish the peer-to-peer communication network. In addition, the project member is authenticated to the project, and the plurality of computing resources is determined for purposes of establishing the peer-to-peer communication network for the project. In one embodiment, an encryption drive key is delivered to the first computing resource for purposes of accessing the first project container, which includes encrypted objects related to the project. In another embodiment, permissioned access is received to an existing encryption key stored on the local computing resource for purposes of accessing the first project container. The encrypted objects include project metadata related to the distributed objects and one or more working objects associated with one or more sub-projects of which the project member is granted permissioned access. Further, one or more session key pairs are generated for purposes of establishing one or more secure peer to peer communication sessions between the plurality of computing resources. A first half of the session key pairs are delivered to the computing resource for purposes of establishing the peer-to-peer communication sessions.

Thus, according to embodiments of the present disclosure, project security is performed by providing authenticated access to a local project container including project metadata and working objects of the local user. Asset management for the project is achieved through the archiving of previous versions of objects in the archive file system and the distribution of project metadata and working objects to distributed nodes of a peer-to-peer communication network for purposes of project collaboration. As such, methods and systems for asset management through a peer-to-peer communication network are disclosed.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
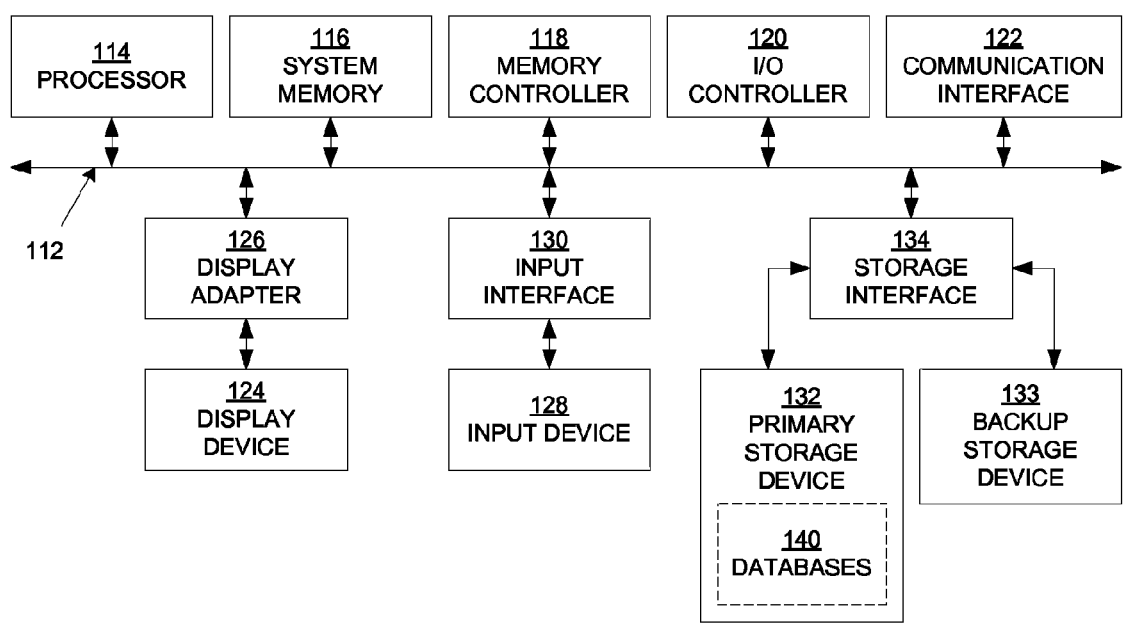
FIG. 1 is a block diagram depicting a computing resource, in accordance with one embodiment of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "sending," "receiving," "encrypting," "decrypting," "authenticating," "establishing," or the like, refer to actions and processes (e.g., flowcharts 600 and 700 of FIGS. 6 and 7, respectively) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), solid state drives (SSDs), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. For example, processor 114 may perform and/or be a means for performing, either alone or in combination with other elements, one or more of the identifying, determining, using, implementing, translating, tracking, receiving, moving, and providing described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112. Memory controller may perform and/or be a means for performing, either alone or in combination with other elements, one or more of the operations or features described herein.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the operations described herein. I/O controller 120 may also be used to perform and/or be a means for performing other operations and features set forth in the instant disclosure.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. Communication interface 122 may perform and/or be a means for performing, either alone or in combination with other elements, one or more of the operations disclosed herein. Communication interface 122 may also be used to perform and/or be a means for performing other operations and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device. In one embodiment, input device 128 may perform and/or be a means for performing, either alone or in combination with other elements, one or more of the operations disclosed herein. Input device 128 may also be used to perform and/or be a means for performing other operations and features set forth in the instant disclosure.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or a plurality of databases or computing devices. For example, databases 140 may represent (be stored on) a portion of computing system 110. Alternatively, databases 140 may represent (be stored on) one or more physically separate devices capable of being accessed by a computing device, such as computing system 110.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Storage devices 132 and 133 may be used to perform, and/or be a means for performing, either alone or in combination with other elements, one or more of the operations disclosed herein. Storage devices 132 and 133 may also be used to perform, and/or be a means for performing, other operations and features set forth in the instant disclosure.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware. For example, computing system 110 may be configured as an application specific integrated circuit (ASIC) adapted to implement one or more of the embodiments disclosed herein.

Figure 2:
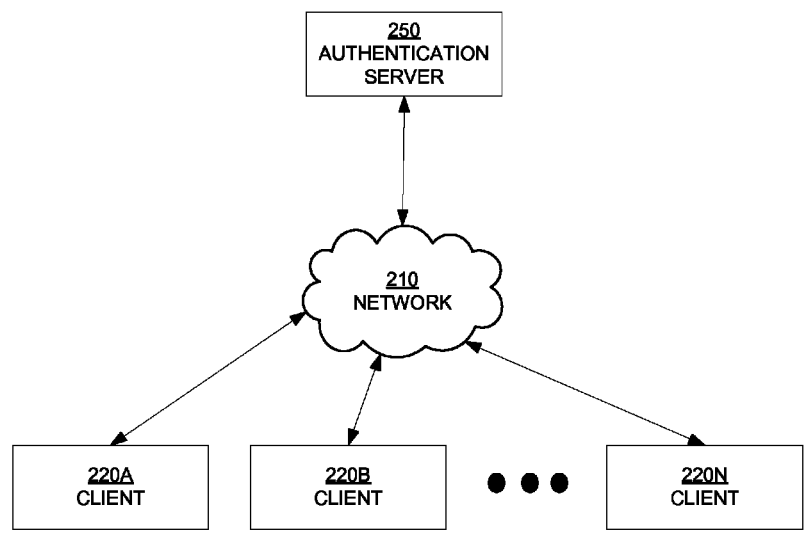
FIG. 2 is a block diagram of an example of a system 200 configured to support a peer-to-peer communication network capable of providing secure collaborative production and management of digital assets, in accordance with one embodiment of the present invention.

FIG. 2 is a block diagram of an example of a system 200 configured to support a peer-to-peer communication network capable of providing secure collaborative production and management of digital assets, in accordance with one embodiment of the present invention. More specifically, system 200 includes one or more client systems 220A-N, each of which is coupled to a communication network 210. In addition, an authentication server 250 is coupled to the communication network 210.

The client systems 220A-N are grouped together on a project by project basis. For instance, one or more project members are associated with the client systems 220A-N and are collaboratively involved in the generation and sharing of digital assets, all relating to the project. That is, client systems 220A-N are used to support a project through the generation of one or more digital assets that are shared between the client systems 220A-N through a secure peer-to-peer communication network supported by network 210. In one embodiment, the authentication server provides each of the client systems 220A-N with the network information necessary to be able to perform network address translation (NAT) traversal in order to communicate with other client systems.

The peer-to-peer communication network includes a distributed application architecture that is able to distribute tasks between peers, such as, the distribution of objects to one or more peers within the network. For instance, since the peers know where each of the nodes are located within the peer-to-peer communication network, the distribution of information or objects (metadata, working objects, etc.) between one or more peers can be handled by one or more peers containing the information. In that manner, the most efficient path at any particular time between two peers is selected for the delivery of a corresponding object.

Further, because the peers each have computing resources, instead of relying on a centralized server architecture, embodiments of the present invention take advantage of the peer-to-peer communication network to distribute processor demand. In addition, careful collection and analysis of associated metadata allow for the efficient coordination of the use of the distributed computing resources.

In addition, authentication server 250 supports secure access and communication within the project. Namely, authentication server 250 provides authentication services such that authorized team members have access to information contained within each of the client systems 220A-N, and also provides the security infrastructure such as session keys so that the communication between each of the client systems 220A-N in the peer-to-peer communication network can be secure.

Client systems 220A-N and authentication server 250 generally represent any type or form of computing device or system, such as computing system 110 of FIG. 1, and is configurable to support and/or run certain software applications. In addition, network 210 generally represents any telecommunication or computer network capable of facilitating communication between one or more nodes including, for example, an intranet, a wide area network (WAN), a local area network (LAN), a personal area network (PAN), internet, near field communication (NFC), telephone services; various wireless technologies, such as, (general packet radio service (GPRS), global system for mobile communications (GSM), enhanced data rate for GSM evolution (EDGE), generations of wireless telephone technologies (e.g., 2G, 3G, 4G, etc.), high speed packet access (HSPA), and high-speed downlink packet access (HSPDA); consumer broadband networks (e.g., various cable technologies, digital subscriber line (DSL), asymmetric digital subscriber line (ADSL), fiber to the home (FTTH), etc.) commercial grade broadband networks (D1, D3, T1, etc.), various security technologies (e.g., virtual private network (VPN), secure socket layer (SSL), etc.), and any other type of network, or permutations on existing networks.

With reference to computing system 110 of FIG. 1, a communication interface, such as communication interface 122, may be used to provide connectivity between each of the client systems 220A-N and network 210. As such, each of the client systems 220A-N may be able to access information on other client systems using, for example, a web browser or other client software. Although FIG. 2 depicts the use of a network (such as the internet) for exchanging data, the embodiments described herein are not limited to the internet or any particular network-based environment.

In one embodiment, all or a portion of one or more of the example embodiments disclosed herein are encoded as a computer program and loaded onto and executed by client systems 220A-N and/or authentication server 250, or any combination thereof. All or a portion of one or more of the example embodiments disclosed herein may also be encoded as a computer program, stored in one or more of the client systems 220A-N and/or authentication server 250 over network 210. Accordingly, network architecture 200 may perform and/or be a means for performing, either alone or in combination with other elements, one or more of the operations disclosed herein. Network architecture 200 may also be used to perform and/or be a means for performing other operations and features set forth in the instant disclosure.

Accordingly, embodiments of the present disclosure illustrate asset management for purposes of facilitating remote and local project members to securely collaborate on projects involving digital files or assets, to include those requiring version control. In some other embodiments, methods and systems support a virtual network of client peers associated with a project that securely communicate with each other within a peer-to-peer network, as controlled by an authentication server. In addition, metadata concerning all distributed objects of the project is separately delivered to the client peers. In that manner, each of the client systems have information relating to the creation of objects within the project as a whole, and further can request, receive, and access, based on access permissions, corresponding objects that are locally stored for purposes of local interaction in support of the project. Further, embodiments of the present invention take advantage of the peer-to-peer communication network to distribute processor demand to localized computing resources.

Figure 3:
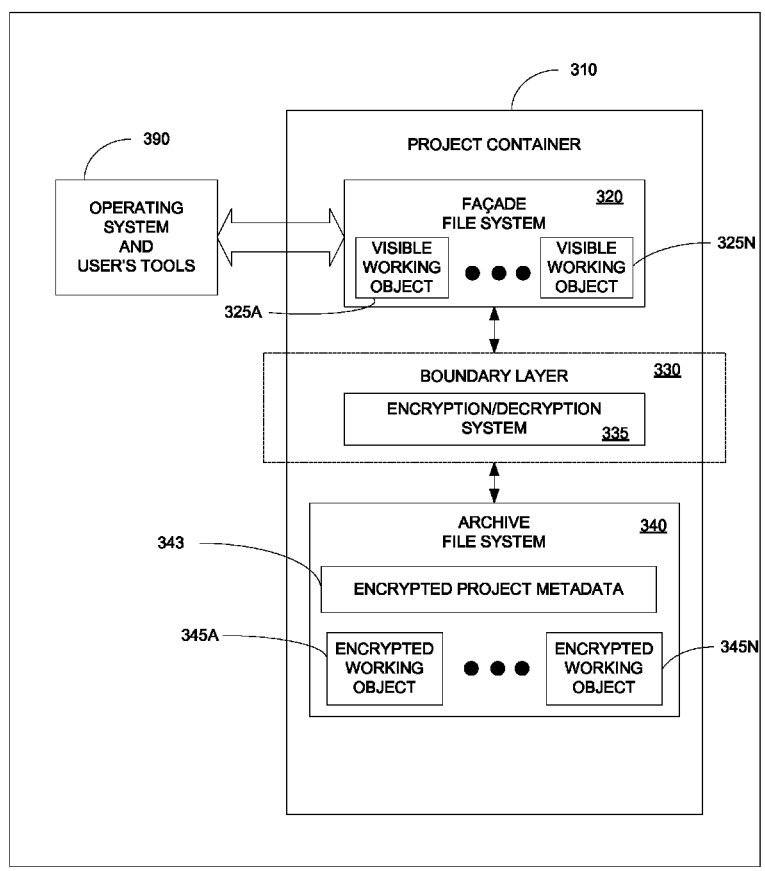
FIG. 3 is a block diagram of a project container configured to store encrypted objects related to a project and to expose working objects relevant to a local project member, in accordance with one embodiment of the present invention.

FIG. 3 is a block diagram of a computing resource 300 including a project container configured to store encrypted objects related to a project and to expose working objects relevant to a local project member, in accordance with one embodiment of the present invention. Computing resource 300 is configurable as computing system 110 of FIG. 1, in one embodiment, and is capable of executing computer readable instructions for purposes of asset management. Computing resource 300 works in conjunction with other similarly configured computing resources in order to provide collaborative production and management of digital assets associated with a project. These computing resources are communicatively coupled together through a peer-to-peer communication network, for example. Namely, objects and information related to the objects (e.g., metadata) are distributed throughout the computing resources, such that all computing resources are aware of the objects, and each computing resource is able to generate and access relevant objects on a local level, and to distribute those relevant objects throughout the network to enable a collaborative effort between all team project members.

In particular, computing resource 300 is able to store objects related to the project in a secure, encrypted manner. Further, when a corresponding member is authorized to participate in the given project, computing resource 300 presents the encrypted objects to the member as native system files. These exposed objects can be acted upon normally by the team member, and/or software applications or tools associated with the computing resource 300. As the team member makes changes to or modifies an existing object, and/or creates a new object, the computing resource 300 is able to encrypt those objects for local storage and deliver those objects to other peer computing resources associated with the project.

As shown in FIG. 3, the computing resource 300 includes a project container 310 that acts as a platform for storing and accessing objects related to the project. In one embodiment, the container 310 is representative of a container comprising a virtual encrypted drive storing secure data, such as, encrypted objects related to the project. The container is specific to a particular project, in that objects related to that project are stored in the project container, and that other objects related to another project are stored in another corresponding project container. Although FIG. 3 shows one project container, the local computing resource is able to support more than one project container corresponding to one or more projects associated with a local user.

As shown, project container 310 includes encrypted objects related to the corresponding project. For instance, the encrypted objects are stored in an archive file system 340 that is hidden from the local project member behind a boundary layer 330. The archive file system 340 stores encrypted objects of the project and the previous versions of the objects if deemed necessary by the users which include project metadata 343 and working objects 345A-N. For instance, previous versions are stored for purposes of version control. The archive file system 340 is restricted such that users do not have access to its contents, in one embodiment.

The encrypted project metadata 343 contains information related to encrypted working objects stored on the local computing resource 300, as well as information related to distributed objects stored in all the computing resources supporting the project. For example, an instance of metadata is associated with an object. The metadata and its association with the object are separately and permanently stored from the object. In one embodiment, the metadata 343 is secured behind the boundary layer 330, such that the local project member cannot directly access the metadata 343. In some cases, metadata is exposed to the local project member through the façade file system (e.g., file size, notes, etc.) The metadata 343 is used by the archive file system 340 to coordinate the distribution of objects (e.g., metadata and working objects) stored in the archive file system 340 throughout the distributed network of computing resources supporting the project. For instance, if a computing resource learns through metadata that a new object or a new version of an object exists somewhere in the distributed network of computing resources associated with a project, then that resource is able to request delivery of that information from any computing resource that has a copy. In addition, the archive file system 340 is able to coordinate the local flow of information within the project container 310 and with the operating system, applications, and tools 390 of the local computing resource 300. In one embodiment, a user can add and bind metadata to an object, or a group of objects (e.g., similarly tagged objects). In another embodiment, a user can select a collection of objects based on metadata.

In one embodiment, the project metadata is synchronized between each of the distributed computing resources supporting the project, but may include unique information related to objects newly stored and committed on the computing resource 300 that is generated prior to complete synchronization. In that manner, each of the computing resources is able to determine where objects are stored within the distributed system of computing resources, and to support the production and management of those resources (e.g., delivery of relevant objects between resources, etc.). In particular, metadata is used to construct a hierarchy of objects (e.g., on an object by object basis, or across one or more objects) relevant to the project, in one embodiment. For instance, a single object may be associated with one or more versions. Metadata is used to provide version control of the object throughout the distributed system of computing resources, such that all computing resources are aware of the previous and current versions of an object. As such, a computing resource with an outdated version of the hierarchy of all objects (e.g., offline for a period of time) is able to create a current hierarchy by requesting and receiving updated metadata.

The encrypted objects also include encrypted working objects 345A-N. The working objects are relevant to the local project member, in that he or she is assigned to perform work on these objects. This work may include generating a working object, or modifying an existing object which in turn creates a new version of the existing object. In either case, new information is generated for inclusion within the archive file system 340. For example, the local project member may be working on object-X collaboratively with other project members, each of which have a copy of object-X (e.g., current and previous versions). Object-X may be associated with a sub-project of the project. At any point in time, the local project member may obtain a copy of the latest version (e.g., version 11) of object-X from its archive file system. After purposely making modifications to object-X, the local project member may commit a new version (version 12) of object-X, which is then stored in the local archive file system. Metadata for version 12 of object-X is generated and a separately stored in the archive file system. The metadata associated with version 12 is delivered to the other project members associated with the sub-project. In addition, a copy of version 12 is delivered, separate from the delivery of the metadata, to the other project members.

Boundary layer 330 forms an encryption layer between the hidden archive file system 340 and the façade file system 320 that is viewable to the local project member. In particular, boundary layer 330 includes an encryption/decryption system 335 that encrypts information to be stored in the archive file system in a commit process, and decrypts information viewable through the façade file system to the local project member. As an example, an encrypted working object 345A is made available to the local project member as a visible working object 325A-N through the façade file system 320 and when requested, is decrypted by system 335.

As such, façade file system 320 provides a view into the drive representing the encrypted container or project container 310, and further provides an interface (e.g., drag and drop) to the façade file system 320, in one embodiment. That is, the façade file system 320 provides access to and stores a copy of one or more working objects, such that that the façade file system 320 is made accessible to authenticated and permissioned users who may view and modify its contents. As an example, the façade file system 320 includes copies of the latest version of the working objects permanently stored in the local archive file system 340. Specifically, the façade file system is mounted as a regular local file system, in one embodiment. As such, façade 320 provides access to corresponding relevant objects accessible through the drive, and includes object names for working objects available to the local project member, as specified through a permission access process implemented by a project owner, for example. In this embodiment, the files would behave as any other native files, and the local team member would not need any other specialized tools or processes to work with or access the objects. It is important to note that other object information (e.g., metadata) may or may not be viewable through the drive representing the project container 310 as shown in the façade file system as determined by the project owner or administrator based on permissions.

In another embodiment, the boundary layer 330 does not include an encryption/decryption system 335, such that objects stored in the archive file system are not encrypted. Those objects as instantiated in the archive file system 340 are still hidden from the local user, and accessible only through the façade file system. Security is still enforced, in part, through initial authentication of the user with the authentication server for purposes of accessing the project container 310 as a whole.

Figure 4:
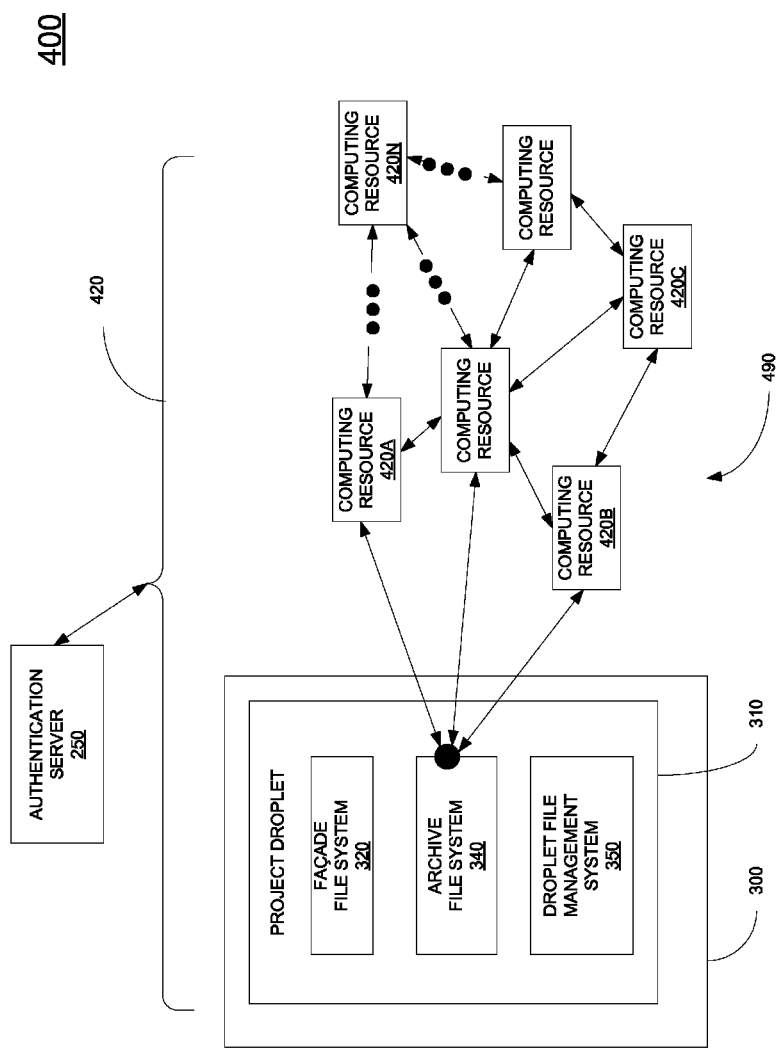
FIG. 4 is a block diagram of a system 400 configured to support a peer-to-peer communication network capable of providing secure collaborative production and management of digital assets, in accordance with one embodiment of the present invention.

FIG. 4 is a block diagram of a system 400 configured to support a peer-to-peer communication network 490 capable of providing secure collaborative production and management of digital assets, in accordance with one embodiment of the present invention. In particular, FIG. 4 illustrates the communication between project containers in a peer-to-peer communication network 490, and more particularly, the transfer of objects between archive file systems associated with the project containers. As such, the distributed network of project containers work in conjunction to provide collaborative production and management of digital assets associated with a project through the peer-to-peer communication network 490.

A shown in FIG. 4, an authentication server 250 provides controlled access to the project container 310 of a computing resource 300. For instance, in one embodiment, authentication server 250 provides one or more encryption keys to the computing resource to unlock the project container 310. In addition, the authentication server 250 provides controlled access to each of the project containers of corresponding computing resources in the plurality of computing resources 420 (e.g., resource 300 and resources 420A-N), each of which is associated with and support a project. It is important to note that the authentication server 250 does not transfer or store any of the digital assets associated with the project, in one embodiment. That is, objects such as, project metadata and working objects of a project are not delivered through the authentication server 250. As such, authentication server 250 purely provides authentication services for accessing encrypted project containers, and establishing communication sessions within a corresponding peer-to-peer communication network, for example.

Furthermore, authentication server 250 controls the establishment of one or more secure direct communication sessions between the plurality of computing resources 420, as will be further described below in relation to FIG. 7. These communication sessions form the peer-to-peer communication network 490 used for the secure collaborative production and management of digital assets in relation to a project. In addition, authentication server 250 controls the establishment of one or more secure communication sessions between the authentication server 250 and each of the plurality of computing resources 420, in one embodiment, as will be further described below in relation to FIG. 7.

In particular, the computing resource 300 communicates with other computing resources directly for the distribution of objects, such as metadata and working objects. For instance, the project container 310 communicates with other project containers in other computing resources 420A-N for the coordinated distribution of objects between corresponding archive files systems. Since the objects flow from encrypted container to encrypted container over secure communication sessions, none of the distributed information is viewable until permission is granted and information is accessed through a corresponding container and its façade file system, as previously described.

For example, archive file system 340 provides metadata objects to be delivered to distributed nodes in the peer-to-peer communication network 490 associated with the project. Since metadata is synchronized between the plurality of computing resources 420, any new metadata generated by the local computing resource for objects related to the project is also delivered from archive file system 340 to the remaining computing resources 420A-N.

In some embodiments, the protocols for operating the peer-to-peer communication network 490 are able to determine the most efficient distribution pattern for delivering the metadata, and other deliverable objects. For instance, functional topology is based on project definitions and then prioritized using physical constraints (e.g., bandwidth and performance considerations). As an example, objects are transferred amongst multiple nodes (peers) based on availability of the nodes, thereby minimizing the instant load on an individual node. In another instance, for purposes of illustration only, the new metadata may be delivered first to a close node and a far node, with subsequent delivery of the metadata performed by other nodes until the metadata is delivered to all the nodes within the peer-to-peer communication network. In addition, an object may be separated out into multiple partitions, each of which is separately deliverable to the relevant computing resources. In that manner, through partial data transfer, network traffic is optimized. For instance, a large object comprising ten partitions may only send out half of the partitions at one time. At a subsequent period when there is less traffic, the remaining partitions may be delivered.

Further, peers can be assigned priority for bandwidth and usage management. Rather than have all nodes within the peer-to-peer communication network be equal in priority, one or more nodes may be given higher priority, while other nodes are conversely given lower priority. For instance, a node primarily used as a backup resource may be given a high priority to best ensure that a backup of the information has been created before any possibility of failure of the node. In addition, the node associated with the project owner may be given high priority. For example, the project owner node may be configured to receive all objects and all object metadata associated with the project. In one implementation, the project owner through its corresponding node and computing resource is continuously logged into the system (e.g., as managed by the authentication server) that provides secure asset management for the project to ensure that it continually updates objects and metadata related to the project.

Figure 5:
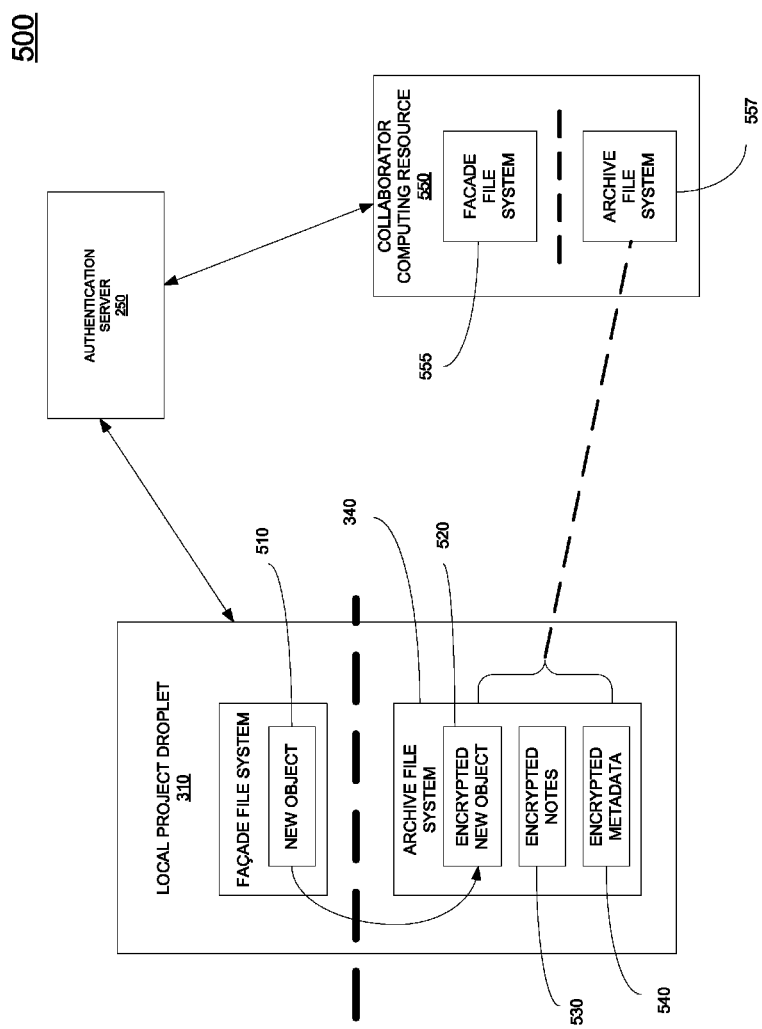
FIG. 5 is a block diagram of a system 500 illustrating the commitment of an object and it subsequent distribution to a relevant computing resource, in accordance with one embodiment of the present invention.

In addition, archive file system 340 is configured to provide new objects for delivery to distributed nodes in the peer-to-peer communication network, as will be further described in relation to FIG. 5. Again, the protocols for operating the peer-to-peer communication network are able to determine the most efficient distribution pattern for delivering the new object to the relevant team members.

Similarly, archive file system 340 is able to accept metadata generated by other computing resources in the plurality of computing resources 420. In addition, archive file system 340 is able to accept relevant working objects generated by other computing resources (e.g., resources 420A-N) of which the local project member is associated with corresponding sub-projects of the working objects.

FIG. 5 is a block diagram of a system 500 illustrating the commitment of an object and its subsequent distribution to a relevant computing resource, in accordance with one embodiment of the present invention. In particular, a new object 510 defined as a completely new file or a new revision of an existing file is generated by the local computing resource 300 and is entered into the local project container 310 through the façade file system. That is, the new object is committed to the project, and is intended for distribution to other collaborators through the peer-to-peer communication network.

In one form, a new object 510 has no relation to previous objects related to the project. That is, the new object has been newly generated and does not have any association with any previous versions. After, the new object 510 is complete and ready for submission, a commit process is executed to enter the new object into the archive file system 340 and distribute the new object 510 to other relevant team members. In another form, the new object is associated with other previous objects related to the project. That is, the new object 510 is a new version of an older, previous version. For instance, the new object 510 may be version 12, and modified the previous version 11 of the related underlying object.

The "commit" process may be distinguished from a "save" process. While the new object 510 is under development, it may be created and saved through the facade file system 320, and not committed to the underlying archive file system 340, in one embodiment. In that manner, the new object 510 under development is encrypted in the façade file system. The new object 510 may also be generated outside of the project container 310 (e.g., on any part of the computer's file system outside of the container), in which case the object 510 is not under management by the container and is therefore not encrypted. In both cases, the new object 510 is not delivered to other relevant team members, until the new object 510 is committed to the project by the user in which case the file is encrypted and copied into the archive file system and then distributed to other project containers.

Before a commitment can take place, the new object 510 must be stored in the façade file system 320. In one embodiment, the user may elect to commit the object 510 through activation of an icon or action button. In another embodiment, the project team may elect to configure the system to support automatic commitment in which the act of saving an object into the container will automatically trigger a commit. In either embodiment, the commit action causes an encrypted copy of object 510 to be created in the archive file system. In addition, new metadata 540 associated with the new object 510 is also generated, and is stored in separately encrypted, container objects which may or may not be exposed to the user or the operation system of the corresponding computing resource. New metadata 540 includes any information relevant or describing the new object 510, and may include, but is not limited to, the following: authorship; a timestamp; version number; a tag; associated notes 530; the time the new object 510 was committed; the time the new object 510 was committed as a group; file size; the user who edited the object 510; users who can access the object 510 as part of a sub-project, etc. In some embodiments of the present invention, metadata provides management and control of the project, objects of the project, users, data, and nodes.

In one embodiment, the new metadata 540 is delivered independently of the associated new object 510. Specifically, the metadata moves asynchronously throughout the peer-to-peer communication network. As such, all active nodes within the network have access to the metadata as soon as it is available.

In one embodiment, a tag associates the new object 510 with other similarly tagged objects distributed throughout the plurality of computing resources associated with the project. For instance, the new object is logically grouped together with other objects similarly tagged, such that an action is performed on all objects associated with the tag. In one embodiment, user and data permissions are controlled by tags. In another embodiment, data transmissions through the peer-to-peer communication network is controlled by tags. In still another embodiment, project structure and organization is controlled by tags.

As described, the metadata 540 may include a note 530, in one embodiment. In another embodiment, the note 530 is separate from the metadata. The note 530 may be received from anyone who has access to new object 510. In particular, note 530 provides additional information relevant to the new object 510. For instance, the note 530 may provide general information related to the new object 510, or may provide instruction to another user on what to do with the new object 510. The note may come in any format (e.g., text, multimedia, Unicode, etc.). In addition, note 530 is associated with the new object 510, though not included within the new object 510. That is, the note 530 is a separate object, and as such does not affect the integrity of the new object 510. In one embodiment, the note 530 is linked to the new object 510.

Once committed, the new object 510 is encrypted for storing in the archive file system 340. In particular, new object 510 goes through an encryption process as implemented by the encryption/decryption system 335. As such, the encrypted new object 520 is ready for storing in the archive file system. In addition, the related note 530 that is also encrypted is stored in the archive file system 340. Further, related metadata 540 that is also encrypted is also stored in the archive file system 340.

In one embodiment, once any object is committed into the archive file system 340, that object is permanently stored in the committed form. Going back to the example where version 11 was previously committed, and version 12 was generated of a corresponding object, version 11 is permanent and unmodifiable. As such, any modification to that corresponding object would have to occur in a new object, version 12.

As shown in FIG. 5, the new metadata 540 is delivered to at least one of the plurality of computing resources associated with the project over corresponding peer-to-peer communication sessions. Though the new metadata 540 is to be deliverable to all the computing resources, the pattern of distribution and delivery is dependent on the protocols established by the peer-to-peer communication network, as previously discussed. For instance, instead of having the project container 310 deliver the new metadata 540 to each of the plurality of computing resources, it may deliver the new metadata 540 to one or two computing resources, and have this subset subsequently deliver the new metadata to other computing resource, etc.

Also, the new object 510 is delivered only to relevant partners or relevant computing resources. For instance, the new object 520 is associated with a sub-project of the project, wherein the sub-project defines one or more team members who collaboratively work on the new object. Sub-project and project team member definitions are established through users permissioned to invite new members, such as, the project owner, an administrator, etc. In that manner, project team members can devote their corresponding computing resources for processing of the new object. As such, instead of relying on a server centric infrastructure to accomplish the same tasks, embodiments of the present invention provide for a distributed architecture for processing objects related to a project.

The new object 510 that is committed to the project, is then delivered to each of the other team members, through corresponding computing resources, associated with the sub-project. For example, the new object 510 may be committed for review by other team members. More particularly, in one embodiment, the new object 510 is decrypted out of the archive file system 340, encrypted using a corresponding session key, and delivered to a collaborator computing resource 550 over the corresponding communication session. Again, the protocols for operating the peer-to-peer communication network are able to determine the most efficient distribution pattern for delivering the new object to the relevant team members. Thereafter, the new object 510 is available to the team member of the collaborator computing resource 550 through its façade file system 555.

Figure 6:
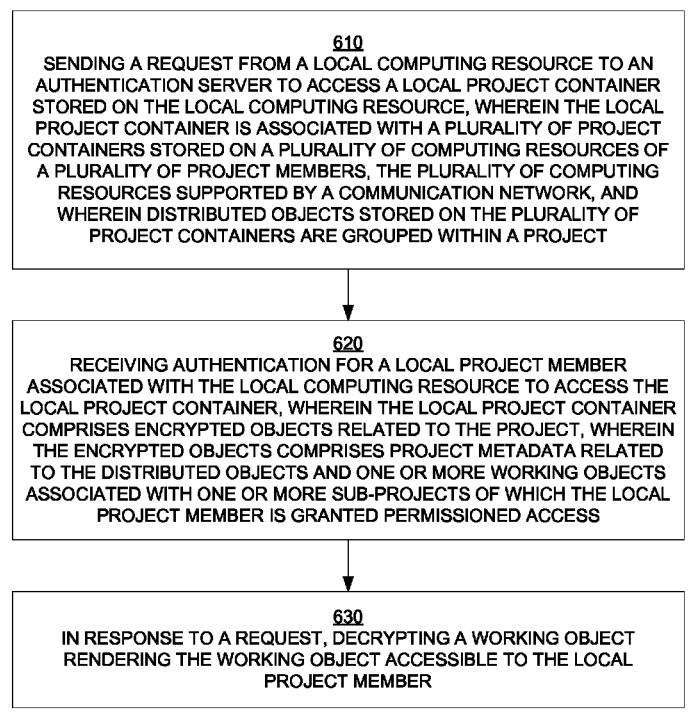
FIG. 6 is a flowchart of a computer-implemented process for storing encrypted objects related to a project and exposing working objects relevant to a local project member, in accordance with one embodiment of the present invention.

FIG. 6 is a flowchart 600 of a computer-implemented process for asset management, in accordance with one embodiment of the present invention. For instance, in one embodiment, the process outlined in flowchart 600 is implemented by the project container 310 of FIGS. 3-5 for storing encrypted objects related to a project and exposing working objects relevant to a local project member.

At block 610, a request from a local computing resource is attempting to authenticate itself for purposes of joining a project and for joining the peer-to-peer communication network associated with the project. In particular, the request is delivered to an authentication server in order to gain controlled access to a local project container stored on the local computing resource. As previously described, the local project container is associated with a plurality of project containers stored on a plurality of computing resources of a plurality of project team members. Distributed objects are stored on the plurality of project containers, and are grouped or tagged in association with the project. In addition, the plurality of computing resources is supported by a communication network, and more particularly, a peer-to-peer communication network.

In one embodiment, the request is delivered over a secure channel. For instance, the request is delivered over a secure socket layer between the local computing resource and the authentication server. In this manner, all communication between the local computing resource and the authentication server is secure, in some fashion.

In block 620, authentication is received from the authentication server. That is, the local project member has been authenticated to the system providing secure collaborative production and management of digital assets. In one embodiment, the authentication system delivers a list of projects to which the local project member preliminarily belongs, for further selection and authentication.

In another embodiment, a local lock-out is determined when the local project member fails to be authorized to the project (e.g., through password, biometrics, or any other authorization technique). As such, the local project member is unable to access the contents of the encrypted container.

Once the local project member has been authenticated to the system and the project, the local computing resource is granted access to the local project container. Encrypted objects related to the project are stored within the local project container, as previously described. For instance, the encrypted objects include project metadata related to the distributed objects stored on one or more computing resources, all of which support the project. The encrypted objects also include one or more working objects, previously described. Each of the working objects is associated with a sub-project, wherein one or more project members, including the local project team member, collaborate on the working objects and as such need access to the working objects. Permissioned access is defined by the project owner or administrator, in examples.

In one embodiment, after the local project team member has been authenticated to the project, one or more encrypted drive keys are received by the local computing resource from the authentication server. In still another embodiment, after the local project team member has been authenticated to the project, one or more encrypted drive keys are received by the local computing resource from one or more client systems 220A-N as directed by the authentication server. In this embodiment, the encryption keys are not held by the server, but within the project. In still another embodiment, permissioned access is received to access existing one or more drive keys stored on the local computing resource. The encryption keys are used for providing access to the local project container associated with the project, and more specifically for decrypting working objects stored in the local project container, and for encrypting information to be stored in the local project container (e.g., new working objects, metadata, notes, etc.), in one embodiment.

In addition, after the local project member has been authenticated to a project, a plurality of project members is identified. In one embodiment, the project members who are currently accessing the system for the management of digital assets are identified, and those who are not available through the network may or may not be identified. As such, the local computing resource receives one or more session keys used to establish one or more secure peer to peer communication sessions with the plurality of project members who are available and currently connected to the project. In that manner, a secure peer-to-peer communication network is created between the plurality of project members for the production, management and distribution of digital assets.

In block 630, a working object is decrypted in response to a request for access. For instance, the working objects are presented in a façade file system representation of a drive of the local project container. Selection of a working object is implemented through the façade file system (e.g., drag and drop process, double click process, etc.). As such, the selected working object is decrypted and presented to the local project member requesting access to the object.

In another embodiment, when the local project member signs off from the system facilitating production and management of digital assets, the local project container is also closed. That is, objects contained within the local project container are no longer shown on a drive in the façade file system. Further, the objects are not decrypted. As such, though a user may see the encrypted local container on their local machines, the encrypted information within the local container remains locked until the local project member reauthenticates to the system.

In still another embodiment, a kill instruction is received from the authentication server. For instance, the kill instruction is generated by the project owner, after the project has been completed. In that case, the kill instruction is possibly delivered to all of the project members associated with the project. In another case, the kill instruction is targeted to one or more project members' containers. For instance, the targeted project members may be untrustworthy, and no longer is granted access to information related to the project. As such, once the kill instruction is received by the local computing resource and verified, access to the local project container is immediately disabled. In addition, all communication sessions with other project members are also terminated. Further, subsequent authentication attempts by the local project member are also denied. In that manner, the local project container and the information contained within are not accessible by the local computing resource and the local project member.

Figure 7:
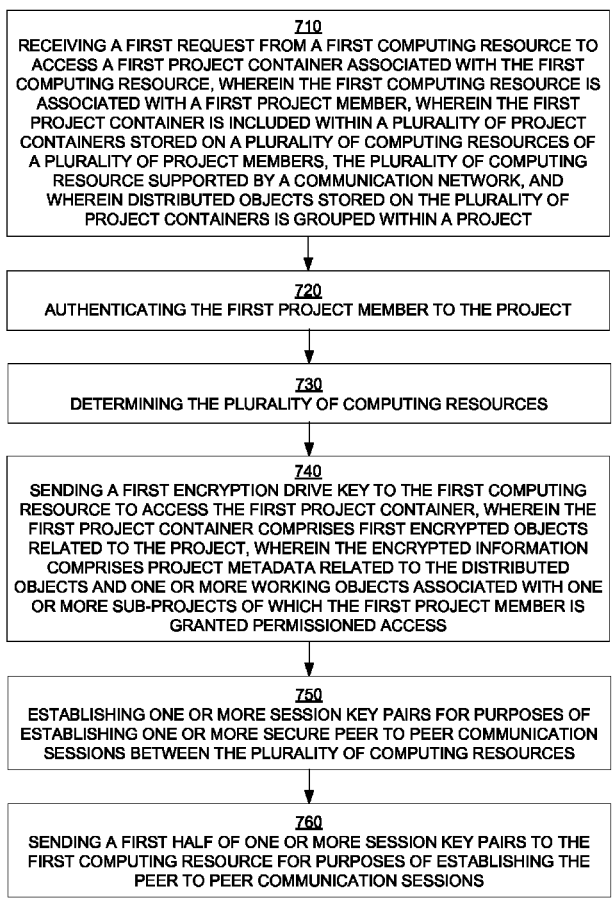
FIG. 7 is a flowchart of a computer-implemented process for authenticating a user to a project, in accordance with one embodiment of the present invention.

FIG. 7 is a flowchart 700 of a computer-implemented process for asset management, in accordance with one embodiment of the present invention. For instance, in one embodiment, the process outlined in flowchart 700 is implemented by the authentication server 250 of FIGS. 2, 4, and 5 to authenticate a user to a project for purposes of providing a secure collaborative environment for the production and management of digital assets.

In block 710, a request is received from a computing resource (e.g., a local resource) to access an associated project container. The computing resource is associated with a user, who is considered as a project member after authentication. The project container is included within a plurality of project containers, each of which is associated with and stored on a corresponding computing resource. As such, a plurality of computing resources associated with a plurality of project members is associated with the project. In addition, the plurality of project members is supported by a communication network, for instance to establish a peer-to-peer communication network for the distribution and management of digital assets related to the project.

In addition, the project container (e.g., the local project container) includes encrypted objects related to the project. For instance, as previously described, the project container includes project metadata related to distributed objects stored on the plurality of project containers. The distributed objects can be grouped and associated with the project, especially in relation to other objects unrelated to the project.

In block 720, the project member is authenticated to the project. For instance, the authentication server is able to compare information related to the project member to a list of authorized users. The list is provided by a project owner, in one embodiment. In another embodiment, the list is generated through an invitation process, whereupon acceptance to join the project, a project member is added to the list.

Further, in block 730, other project members are determined. Specifically, other project members currently accessing the system providing management and distribution of assets related to the project (e.g., online with the system) are identified for purposes of establishing the peer-to-peer communication network. As such, one or more computing resources associated with the identified project members associated with the project are determined.

In block 740, after authentication is verified, an encryption drive key is delivered to the computing resource (e.g., the local computing resource). The encryption key enables the resource to access the project container, and further to encrypt and decrypt information flowing into and out of the encrypted container.

In addition, the encrypted project container includes encrypted objects related to the project. For instance, the encrypted objects includes project metadata related to distributed objects stored in the plurality of project containers. Also, the encrypted objects includes one or more working objects of one or more sub-projects to which the project member is associated. As such, the project member is granted permissioned access to the working objects.

In block 750, one or more session keys are also delivered to the computing resource for purposes of establishing one or more secure peer to peer communication sessions between the plurality of computing resources. That is, once the other project containers, and corresponding computing resources are identified, a peer-to-peer network of distributed resources is established or expanded to include the local computing resource for purposes of enabling the production, management and distribution of digital assets related to the project. Specifically, one or more session key pairs are created or established. The authentication server controls at least the generation of the session key pairs, in that delivery of half of the key pair is made to corresponding computing resources.

In that manner, the authentication server controls the communication session by controlling delivery of the keys. Specifically, in block 760, a first half of one or more session key pairs is delivered to the local computing resource. In addition, the second half of the one or more session key pairs is delivered to the corresponding computing resources for purposes of establishing communication sessions between the local computing resource and the other computing resources. In that manner, the peer-to-peer communication network is established or expanded.

The process outlined in flowchart 700 is equally applicable to other project members who wish to log-on and join in the secure collaborative production and management of digital assets in association with the project. For instance, a second request from a second computing resource is received, the request directed to accessing a second project container associated with the second computing resource. The second computing resource is associated with a second project member. The second project member is authenticated to the project, after which, a second encryption drive key is delivered to the second computing resource to enable access to the second project container. The second container comprises second encrypted objects related to the project, including second project metadata and a second group of working objects. In addition, a session key pair is generated for purposes of establishing a secure peer to peer communication session between the first and second computing resources. In addition, other key pairs are generated for purposes of establishing secure communication sessions between the second computing resource and the remaining computing resources belonging to the project. Halves of the session key pairs are delivered to the second computing resource and the other computing resources forming the communication sessions with the second computing resource. For instance, a first half of a session key pair is delivered to the first computing resource, and a second half of the key pair is delivered to the second computing resource for purposes of establishing a communication session between the first and second computing resources.

In addition, an instruction is received to disable access to the first project container. For instance, the instruction is delivered by a project owner controlling the project to the authentication server that determines that the team member has the authorization to act as a project owner or administrator. The project member associated with the first project container may be found to be untrustworthy, or may have been transferred to another project. In either exemplary case, the project member no longer needs access to the first project container. As such, a kill command is delivered from the authentication server to the first computing resource, and more specifically to the encrypted container and its file systems for purposes of disabling access to the first project container and objects contained therein.

Further, the instruction may be extended to all of the plurality of project containers. For instance, the project may have been completed, and no one associated with the project needs to access information related to the project. As such, a global kill command is delivered to the plurality of computing resources, and more specifically to corresponding encrypted containers and/or corresponding file systems for purposes of disabling access to the plurality of project containers.

Additionally, project owners may access the authentication server and remove all project members from the project. This effectively removes all future access to the project by anyone other than the project owner. In one embodiment, a project member is not removed from the project, but permanently disabled. In that manner, a record is kept of the objects and actions associated with that project member.

Thus, according to embodiments of the present disclosure, secure and collaborative production, management and distribution of digital assets related to a project is achieved.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

The invention claimed is:

1. A method for secure distributed asset management, comprising:
    sending a request from a local computing resource to an authentication server to access a local encrypted project container stored on said local computing resource, wherein said local encrypted project container is associated with a plurality of project containers grouped within a project and stored on a plurality of computing resources of a plurality of project members, said plurality of computing resources supported by a communication network, and wherein distributed objects stored on said plurality of project containers are grouped within said project such that a first object generated on any of said project containers of said plurality of computing resources in association with said project is stored on each of said plurality of project containers and locally accessed through one of said plurality of project containers with proper authentication by said authentication server;
    receiving authentication for a local project member associated with said local computing resource to access said local encrypted project container, wherein said local encrypted project container comprises encrypted objects related to said project, wherein said encrypted objects comprises project metadata related to said distributed objects and one or more working objects of which said local project member is granted permissioned access;
    in response to said request, decrypting a working object rendering said working object accessible to said local project member;
    receiving a new object for committing to a sub-project;
    generating new metadata associated with said new object;
    storing said new object in said local encrypted project container;
    storing said new metadata in said local encrypted project container;
    sending said new metadata to one or more of said plurality of computing resources over corresponding peer to peer communication sessions; and
    sending said new object to one or more project members associated with said sub-project who are granted permissioned access over said corresponding peer to peer communication sessions.

2. The method of claim 1, wherein said receiving authentication further comprises:
    receiving an encryption key for decrypting said working objects accessed from said local encrypted project container and for encrypting said working objects stored in said local encrypted project container.

3. The method of claim 1, wherein said receiving authentication further comprises:
    receiving access to an existing encryption key stored on said local computing resource for decrypting said working objects accessed from said local encrypted project container and for encrypting said working objects stored in said local encrypted project container.

4. The method of claim 1, wherein said sending a request further comprises:
sending said request over a secure communication channel.

5. The method of claim 1, further comprising:
receiving one or more sessions keys;
establishing one or more secure peer to peer communication sessions with project members over said communication network using said session keys.

6. The method of claim 1, further comprising:
receiving a note associated with said new object; and
attaching said note to said new object as part of said new metadata.

7. The method of claim 6, further comprising:
receiving a note associated with said new object; and
attaching said note to a group of objects associated with said new object as part of said new metadata.

8. The method of claim 1, further comprising:
associating a tag with said new object, wherein said new object is grouped together with other objects similarly tagged, such that an action is performed on all objects associated with said tag.

9. The method of claim 1, further comprising:
receiving new metadata associated with a new object generated by a remote project member assigned to a sub-project associated with said local project member; and
receiving said new object from one of said project members having said new object.

10. The method of claim 1, further comprising:
closing said encrypted container when said local project member signs off.

11. The method of claim 1, further comprising:
receiving a kill instruction from said authentication server; and
disabling access to said local project container by said local computing resource.

12. A non-transitory computer-readable storage medium having stored thereon, computer-executable instructions that, when executed by a computer system causes the computer system to perform a method for asset management, comprising:
receiving a first request from a first computing resource to access a first project container associated with said first computing resource, wherein said first computing resource is associated with a first project member, wherein said first project container is included within a plurality of project containers grouped within a project and stored on a plurality of computing resources of a plurality of project members, said plurality of computing resources supported by a communication network, and wherein distributed objects stored on said plurality of project containers are grouped within said project such that a first object generated on any of said project containers of said plurality of computing resources in association with said project is stored on each of said plurality of project containers and locally accessed through one of said plurality of project containers with proper authentication by said authentication server;
authenticating said first project member to said project;
determining said plurality of computing resources;
sending a first encryption drive key to said first computing resource to access said first project container, wherein said first project container comprises first encrypted objects related to said project, wherein said encrypted information comprises project metadata related to said distributed objects and one or more working objects associated with one or more sub-projects of which said first project member is granted permissioned access;
establishing one or more independent session key pairs for purposes of establishing one or more secure peer to peer communication sessions between said plurality of computing resources;
sending a first half of one or more session key pairs to said first computing resource for purposes of establishing said peer to peer communication sessions;
receiving a new object for committing to a sub-project;
generating new metadata associated with said new object;
storing said new object in said local encrypted project container;
storing said new metadata in said local encrypted project container;
sending said new metadata to one or more of said plurality of computing resources over corresponding peer to peer communication sessions; and
sending said new object to one or more project members associated with said sub-project who are granted permissioned access over said corresponding peer to peer communication sessions.

13. The computer readable storage medium of claim 12, wherein said method further comprises:
sending a second half of said one or more session key pairs to remaining computing resources of said plurality of computing resources.

14. The computer readable storage medium of claim 12, wherein said method further comprises:
establishing a first session key pair for purposes of establishing a first secure peer to peer communication session with said first computing resource;
sending a first half of said first session key pair to said first computing resource; and
establishing said first secure peer to peer communication session.

15. The computer readable storage medium of claim 12, wherein said method further comprises:
receiving a second request from a second computing resource to access a second project container associated with said second computing resource, wherein said second computing resource is associated with a second project member;
authenticating said second project member to said project;
sending a second encryption drive key to said second computing resource to access said second project container, wherein said second project container comprises second encrypted objects related to said project, wherein said second encrypted objects comprises second project metadata related to said distributed information and second working objects associated with one or more sub-projects of which said second project member is granted permissioned access;
establishing a session key pair for purposes of establishing a secure peer to peer communication session between said first and second computing resources; and
sending a first half of said session key pair to said first computing resource; and
sending a second half of said session key pair to said second computing resource.

16. The computer readable storage medium of claim 12, wherein said method further comprises:
receiving an instruction to disable access to said first project container;
sending a kill command to said first computing resource for purposes of disabling access to said first project container by said first computing resource.

17. The computer-readable storage medium of claim 16, wherein said method further comprises:
- receiving an instruction to disable access to said plurality of project containers;
- sending a plurality of kill commands to said plurality of computing resources for purposes of disabling access to said plurality of project containers.

\* \* \* \* \*